United States Patent [19]

Tradt et al.

[11] Patent Number: 4,852,237
[45] Date of Patent: Aug. 1, 1989

[54] METHOD AND APPARATUS FOR MOUNTING WINDSHIELDS ON VEHICLES

[75] Inventors: Hans-Richard Tradt, Friedberg; Hans Schillmeier, Kaufbeuern, both of Fed. Rep. of Germany

[73] Assignee: Kuka, Fed. Rep. of Germany

[21] Appl. No.: 137,467

[22] Filed: Dec. 23, 1987

Related U.S. Application Data

[63] Continuation-in-part of Ser. No. 928,466, Nov. 7, 1986, abandoned.

[30] Foreign Application Priority Data

Nov. 9, 1985 [DE] Fed. Rep. of Germany ....... 3539797
May 14, 1987 [DE] Fed. Rep. of Germany ....... 3716232

[51] Int. Cl.$^4$ ..................... B23Q 17/00; B23P 21/00; B66C 23/00; B25J 11/00
[52] U.S. Cl. ........................ 29/407; 29/709; 29/712; 29/721; 29/824; 414/737; 414/744.5; 901/7; 901/35; 901/40; 901/47
[58] Field of Search ................ 29/407, 430, 705, 709, 29/711, 712, 714, 720, 721, 822, 823, 824, 791; 414/737, 744 B; 901/1, 35, 40, 46, 47

[56] References Cited

U.S. PATENT DOCUMENTS

| | | | |
|---|---|---|---|
| 4,105,925 | 8/1978 | Rossol et al. | 901/7 |
| 4,278,046 | 7/1981 | Clarke et al. | 901/7 |
| 4,453,303 | 6/1984 | Leddet | 29/407 |
| 4,553,309 | 11/1985 | Hess et al. | 29/791 |
| 4,561,176 | 12/1985 | Leddet | 29/822 |
| 4,654,949 | 4/1987 | Pryor | 29/709 |
| 4,669,168 | 6/1987 | Tamura et al. | 29/709 |

Primary Examiner—Bruce Y. Arnold
Assistant Examiner—Ronald M. Kachmarik
Attorney, Agent, or Firm—McGlew & Tuttle

[57] ABSTRACT

Windshields are automatically mounted on automobiles on the assembly-line by advancing a gripping device carrying the windshield and associated position sensors relatively towards the automobile, moving the sensors over a windshield opening in the automobile body shell and across edges of the shell defining such opening to provide signals indicating the position of such edges. Such measurements take place firstly on a gross scale and subsequently on a fine scale along at least four axes during the mounting process. The gross position of the windshield opening is first detected using the gross sensors. Starting from a reference point determined in the course of the gross measurement, a gripping device is then moved towards the upper edge of the windshield opening until a first of two fine sensors moves across such upper edge when the gripping device is pivoted around the detected point until the second fine sensor also moves across the upper edge. The positions signalled by such sensors are used to calculate and compensate for a position error in the angular presentation of the window.

15 Claims, 5 Drawing Sheets

METHOD AND APPARATUS FOR MOUNTING WINDSHIELDS ON VEHICLES

This application is a continuation-in-part application of U.S. application Ser. No. 06/928,466 filed Nov. 7, 1986, now abandoned.

The invention relates in general to automatic mechanisms and in particular to a new and useful process and a device for automatically mounting windshields on motor vehicles.

It is part of the state of the art to use industrial robots with a gripping device to pick up the windshield in order to mount windshields. In order to be able to position such industrial robots precisely, the position of the windshield opening on the motor vehicles must be measured. For the purpose stationarily installed video cameras are used that detect the position of the windshield opening or the edges thereof, evaluate them and then control the industrial robot. These video systems however, suffer the disadvantage that they limit the field of motion of the industrial robot by their fixed mounting and furthermore are also very expensive.

U.S. Pat. No. 4,453,303 issued June 12, 1984 to Leddet teaches a device and process for the automatic setting of a window element into a vehicle body. The method uses a setting tool which is equipped with sensors for detecting the proximity of the vehicle body and particularly the frame to receive the window element. The sensors send control signals to a drive element of the tool so as to position the tool correctly with respect to the body. The rough positioning is controlled by separate sensors in the form of a mechanical end switch and two optical proximity sensors. The switch is itself arranged on the manipulator or tool and indicates the middle position of the grip relative to the central axis of the car body transfer line. The sensors carried by the tool or carried sensors EA - EE are mere distance sensors which are directed at the surface of the car body lying outside the windshield opening. Lateral sensors EA and EE are tilted in accordance with the inclination of the roof brace of the automobile for the purpose of detecting the surface of the car body. By use of the sensors and the control system, the installation position is determined when all sensors EA through EE signal the nominal distance from the particular surface of the car body. The reference points of the car body are chosen so that the proper distance of the sensor is achieved for only one correct angular position of the tool.

The device taught by Leddet has a drawback relating to the fact that the sensors do not measure the windshield opening directly. Instead, the sensors measure the adjoining surfaces of the car body. This results in considerable uncertainties from skewing and other errors in the surfaces of the car body. Further, the installation costs of the system taught by Leddet are quite high. Further disadvantages involve the fact that the sensors must be directed at inclinations of the surfaces of the car body and the nominal distance must be exactly determined. Also, the system taught by Leddet involves the disadvantage relating to the fact that the installation device with its rigid gantry must be precisely positioned relative to the car body transfer line.

SUMMARY OF THE INVENTION

The present invention provides a simpler and more economical process and device for the automatic mounting of windshields.

The process of the present invention contemplates two situations for the precise measurement of the windshield opening for precisely mounting the windshield. In a first configuration the motor vehicle body is grossly positioned and then the windshield positioning is determined by use of two stages of sensing, with a gross and a fine measurement. According to a second embodiment of the invention, a more precise transport unit is employed to more precisely position the motor vehicle such that the motor vehicle is brought into an exact preliminary position relative to the manipulator or industrial robot.

In accordance with one embodiment of the invention, sensors for detecting and measuring the windshield opening are carried along on the manipulating device for the windshield during the mounting of the windshield. These sensors are thereby brought rather close to the grossly prepositioned motor vehicle. This means that even economical sensors with a smaller range than the video systems can be used, even though they must make very precise measurements in spite of being at a considerable distance.

The process pursuant to one embodiment of the invention offers the further advantage that by working in two stages, with a gross and a fine measurement, the process allows for a high degree of measurement precision in its ultimate results. Via the gross measurement, a provisional reference point is calculated after which fine measurement takes over. That reference point may be simply the approximate midpoint of the windshield opening or approximate, subsequent mounting midpoint. In this respect, the differences in measuring precision and range of the gross and fine sensors can be put to use advantageously. The gross sensors have a greater working range and lower measuring precision, which is sufficient in any case for establishing the reference point and bringing the windshield and the fine sensors close to the windshield opening. Thereupon, highly sensitive fine sensors can be brought into play that have a smaller working range that coincides with their greater sensitivity.

Alternatively, according to the invention, the process may take advantage of a more precise transport unit which positions the motor vehicle such that the vehicle is brought into an exact preliminary position relative to a manipulator. With this first step, the rough measurement is unnecessary and only a single step measurement of the windshield opening is required. The precise measurement of the windshield opening may now take place. Identical edge-fielding precision sensors and a distance sensor are employed which are lengthwise-adjustable and tiltable. Preferably these sensors are secured the arm or an arm of the grip. The sensors are moved crosswise over the windshield opening in order to center the windshield in the axes of translation. To correct for angle errors, a plurality of sensors placed alongside each other with a spacing on one edge of the windshield, are employed. Alternatively, the sensors may also be mechanical probes, capacitive or inductive proximity transmitters or the like. For a most reliable feeling of the edges of the windshield opening, optical sensors are recommended particularly in the form of reflected light sensors.

According to the invention, a grip is moved along the installation line up to the edge of the opening to be measured. When a first sensor transmits an edge signal, the edge signal is saved in the track control of an industrial robot as path information. The grip is then moved further on until the second sensor transmits an edge signal. This edge signal of the second transmitter also saved. From the positional coordinates, the distance of the sensors in the direction of motion resulting from the crooked position is calculated in the robot control. This value represents the sign of the error angle relative to the distance between the sensors on the grip. The error angle is evaluated from this in the track control and used as a correction factor for the position of the windshield.

The process pursuant to the invention also makes it possible to measure the windshield opening almost completely independently of the color of the paint on the vehicle body. The windshield must ultimately fit precisely in the surrounding groove of the body, so that the step-down of the groove must be included as a reference edge in measuring the opening. Not until the fine sensors are brought in close can this edge be detected dependably without misperception due to the color of the paint and other ambient influences. The gross sensors, on the other hand, pick up the free inside edge of the surrounding groove in the bodywork, which can be detected even at a considerable distance as a metal rim or as a light/dark differentiation, depending on the nature of the sensor.

In the process pursuant to one embodiment of the invention, the windshield opening is roughly measured, at least in terms of the position of two edges perpendicular to one another, and the reference point for fine measurement is determined from that. It is also possible, however, to measure all four edges of the windshield opening and from that to derive the rough mid-point of the windshield opening to use as the reference point. The gross measurement also includes distance determination and correction, if need be.

Fine measurement can proceed from the reference point in the same fashion as the gross measurement by transversely overrunning the edges of the windshield opening. In this process, at any rate, centering should occur with respect the windshield opening edges that will be visible later on the finished motor vehicle. After the fine measurement, the windshield is correctly positioned with respect to the windshield opening in the two translational axis perpendicular to them. Positioning errors are now possible only with respect to the other three rotational axes.

With the process pursuant to the invention for fine positioning, along with measurement and positioning in the translational axes, any twisting around the rotational axis that is perpendicular to the windshield surface can be corrected. For this purpose, after the above-described centering, the pair of fine sensors are moved from the reference point towards one edge of the windshield opening.

As soon as one of the two sensors detects the step of the groove in the bodywork, the windshield is rotated around this reference point until the second fine sensor also detects the groove. Thus, by a very simple procedure, the windshield is now positioned with respect to the said step. It is recommended, therefore, that the step on the upper edge of the windshield opening be used for the purpose. This edge is visible later on the finished vehicle, so that the greatest possible accuracy in fit is called for here.

Starting from the step, however, the windshield can also be fine-centered with respect to the opposite step At this point, the only position errors of the windshield that remain are tilt positions around the two rotational axes in the plane of the windshield. These errors can be corrected by further distance measurements with fine sensors. In addition, however, the invention provides an even simpler solution, in that the windshield is pressed against the groove in the bodywork with an even pressure at a number of points distributed over its surface until it touches all around. At these different points the windshield can move different distances.

With this method, the windshield can be pressed even against body grooves that are deformed by welding lag or for some other reason.

Pursuant to the invention the sensors are attached to the gripping device and extend laterally over the windshield. Since to center the windshield in the translational axes the sensors are moved along those axes over the windshield opening, essentially all that are needed are a gross sensor and a pair of fine sensors. The two fine sensors are placed on one edge of the windshield, preferably the upper edge, for the above-mentioned correction of rotation error. In the simplest version, the gross sensor can also handle the distance measurement. For maximum measurement precision, it is recommended that at least one gross sensor and one distance sensor be provided on three edges of the windshield. Then, in addition, two additional fine sensors should be placed on the two side edges of the windshield for centering with respect to the sides.

The sensors may differ in design, for instance, they may be mechanical feelers, capacitive of inductive approach detectors or the like. For reliable sensing of the inner edge of the groove and the step, however, the use of optical sensors is particularly recommended, more particularly in the form of reflex light scanners. These will differ in reach or working range and sensitivity corresponding to their use as fine or gross sensors. Various types may be employed especially for edge sensing with almost no regard to the surface color. The range of variation in measurement which results with different surface colors is negligibly small with such sensors. Distance measurement should preferably be done with reflex light scanners, especially designed as distance sensors.

The even pressing of the windshield pane into the groove in the bodywork to remove tilt error can most easily be done with the aid of hydraulic or pneumatic adjusting cylinders that hold the windshield via vacuum grippers or the like and are connected with one another via a common circular line. As a result, the cylinders are under the same pressure and move the windshield through different distances until it rests on the groove of the bodywork with equal pressure all over. Alternatively, a circulating pneumatic bag system (a hose ring system) can be used for individually pressing in the windshield.

The same effect can be achieved with individually controlled and disconnectable cylinders or other adjusting means. They may be controlled by means of an electric microswitch or a similar end position indicator placed on the surfaces of the bodywork bounding on the groove in the bodywork.

Accordingly, it is an object of the invention to provide a process for mounting a windshield onto a frame of a vehicle which has a windshield support groove with lateral and top and bottom end steps using manipulator which has a movable manipulator arm carrying a plurality of gripping devices engageable with the windshield and having a plurality of gross and fine sensors spaced around the windshield comprising using the gross sensors to control the manipulation to move the manipulator arm to position the gripping device to engage the windshield and to effect an initial positioning of the windshield with respect to the frame, and thereafter using the fine sensors to control the manipulators arm to reposition the windshield in respect to the frame and to move it on the frame.

A further object of the invention is to provide a manipulator device for mounting a windshield in a vehicle such as an automobile which comprises a gripping device which is adapted to be secured to the manipulator arm includes a plurality of gripping members which are engageable with the windshield and including a plurality of supporting elements extending outwardly of the gripping devices and carrying both gross and fine sensors connected to the manipulator for maneuvering the windshield using the gripping element with at least two of the fine sensors being located on a respective side of the windshield at spaced locations from each other.

Still another object of the invention is to provide for precisely measuring a windshield opening for mounting a windshield in a windshield opening including the steps of holding sensors crosswise over the windshield opening in order to center the windshield in the axis of translation utilizing at least one edge-feeling sensor. Correcting angle errors using at least a pair of edge-feeling sensors, one sensor placed alongside another sensor. Moving the sensors along the installation line up to the edge of the opening to be measured such that a first sensor transmits and edge signal. The edge signal is saved in a control such as a track control of the industrial robot or manipulator. Subsequently, a second sensor transmits an edge signal which is also saved. Calculating the distance of the sensors in the direction of motion resulting from a crooked position based on the position of ordinance by a robot control system. The distance resulting from the crooked position having a value which represents the sign of the error angle relative to the distance between the sensors on the grip. The error signal may then be evaluated and then used as a correction factor for positioning the windshield.

A further object of the invention is to provide an apparatus for automatically mounting the windshield on a motor vehicle which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

GENERAL DESCRIPTION OF THE PREFERRED EMBODIMENTS

Figure 1:
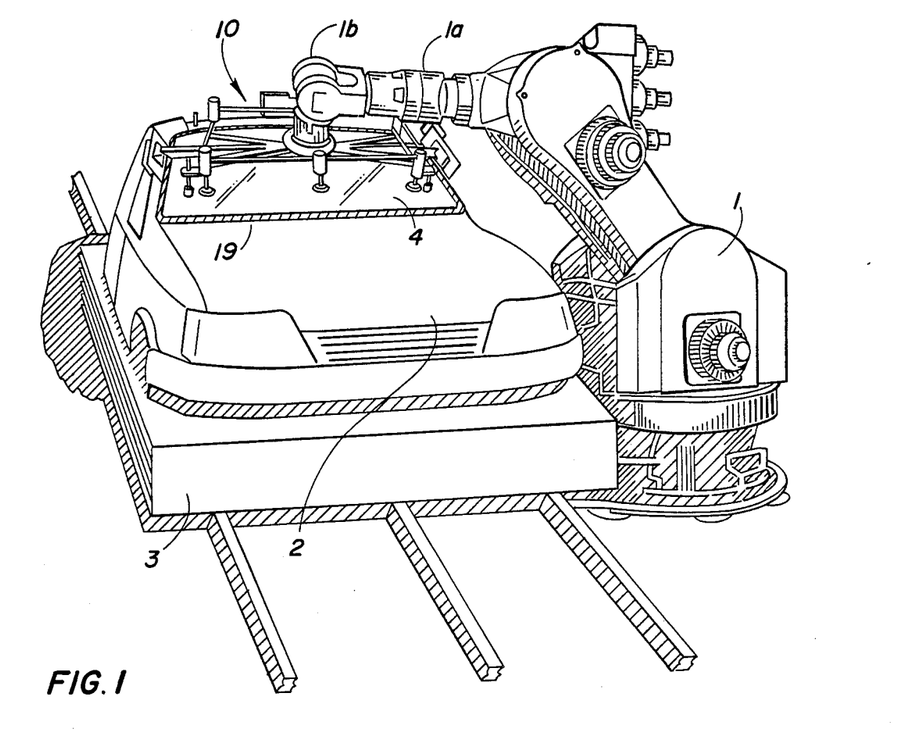
FIG. 1 is a perspective view of a manipulating device for positioning a windshield on a motor vehicle in accordance with the invention.

Referring to the drawings in particular the invention embodied therein comprises the manipulator device 1 which is shown in FIG. 1 as located alongside a windshield applying station into which an automobile 2 is moved on a conveyor 3. The manipulating device includes a manipulator arm 1a having an outer end 1b which supports a combination gripping device and sensor carrier generally designated 10 in a manner such that the gripping device may be rotated or pivoted relative to the arm 1a under controls fed to the manipulating device 1.

FIG. 1 shows an industrial robot or other manipulating device 1 that automatically mounts windshields 4 onto motor vehicles 2 with a gripping device 10. The motor vehicle 2 is moved by means of a conveyor system 3 to a prepositioned location with respect to the manipulating device 1. The manipulating device 1 takes a windshield 4 with its gripper 10 from a stack, not shown, and moves it over to the windshield opening of the prepositioned motor vehicle 2. In this step the windshield is brought within approximately 100 mm of the windshield opening.

With the device shown, the front windshield of the vehicle is being mounted. However, with the same device and using the same process, the back window and the side windows can also be automatically mounted. Moreover, with the process and device described below, the manipulating device 1 can also grip windows with a precise fit from a pile that is not regularly sorted.

Figure 2:
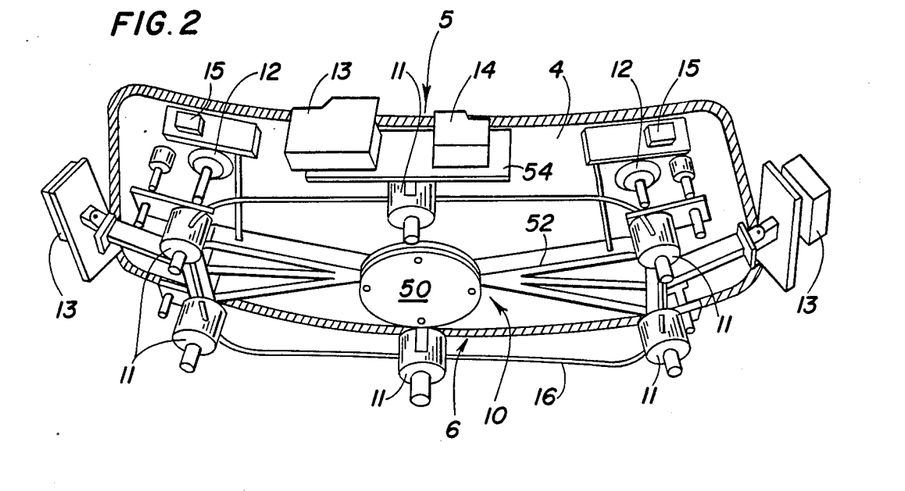
FIG. 2 is a perspective top view of the gripping device with a windshield of FIG. 1.

According to FIG. 2, the gripping device comprises a central flanged plate 50 from which a plurality of angularly spaced arms 52 project radially. The gripping device is attached to the manipulating device via the flanged plate. At the ends of the arms are located four or six pneumatic adjusting cylinders 11 that hold the windshield 4 to be mounted by means of vacuum grippers 12. Four adjusting cylinders 11 are positioned in the corner areas and two adjusting cylinders 11 in the middle of the long upper and lower edges 5,6 of the windshield 4. The adjusting cylinders are connected with one another by means of a circular fluid line 16 are supplied via the manipulating device 1 from a source of compressed air (not shown).

On other arm 54 are mounted longitudinally adjustable and tiltable sensors 13, 14 and 15. A fine sensor 15 is positioned in each corner of the upper edge 5 of the windshield, while a gross sensor 13 and a distance sensor 14 are positioned in the middle. In the middle of the two side edges and the lower edge 6 are placed a gross sensor 13 and a fine sensor 15 in each of those locations. The sensors 13, 14, 15 are designed as reflex light barriers. The fine sensors 15 have, for the sake of high measurement precision, a narrow measuring range with a correspondingly small field of action and are largely insensitive to differences in surface color. The gross sensors 13 operate at a greater distance with a broader measuring range. The distance sensors 14 are designed as special approach detectors. The sensors 13, 14 and 15 extend beyond the edges of the windshield and detect the various edges of the window opening 19.

The measuring process is described in more detail with reference to FIGS. 3 and 4. With the gripping device 10 with the windshield and the sensors 13, 14 and 15 in approximate position, the process begins of measuring the windshield opening 19 into which the windshield is ultimately to be precisely fitted. The lower portion of FIG. 4 illustrates this fit, in which the windshield 4 should come to rest tight against and flush with the surface of the bodywork. As the drawing makes clear, an adhesive bead 17 and a rubber weatherstrip 18 have already been applied all around the edges of the windshield pane 4. The rubber weatherstrip 18 can also be put on afterwards.

The window opening 19 in the motor vehicle 2 is surrounded by a groove 7 in the bodywork that present two defined edges for measurement in the form of a step 8 and an inner edge 9. The windshield 4 must be centered between the steps 8 and fitted in with an identical space all around to the extent possible. The step 8, however, cannot be reliably measured from the approximate position.

For purposes of the gross measurement, the gripping device is first moved crosswise in the direction of the edges of the window opening. In the approximate position, the gripping device 10 with the windshield 4 is already prepositioned approximately parallel to the windshield opening 19. For purposes of gross measurement, movements take place in the plane of the windshield pane. As soon as the gross sensors 13 in their path of motion pass over the inner edges 9 of the surrounding groove 7 in the bodywork, which edges will run transverse in each case to that path of motion, the edge will be recorded as a binary signal reflecting a change from light to dark and the signal will go to the control unit of the manipulating device 1 (not shown). The control unit will store the event-coordinated actual position value in the memory.

Next in this process there is a straight-line movement parallel to the upper edge 5 of the window opening 19, whereby the location of the A-columns (right/left) is determined. From these two position values, the midpoint of the length of the window opening is determined. Starting from this provisional midpoint, the location of the upper and lower edges 5,6 is then sought in an analogous manner.

By taking the means of these measured actual values, the provisional midpoint of the window opening are is then determined.

Also as part of the gross measurement of the windshield opening 19, the distance to the groove 7 in the bodywork is determined by moving in the distance sensor 14 one or more times, and the desired value is moved toward.

The position of the inner edge 9 with respect to the step 8 is subject to tolerances. This circumstance makes fine measurement necessary, for which purpose the gripping device is moved closer in to the window opening 19, taking note of the corrected distance values.

In the same fashion as for the gross measurement, the precise location of the step 8 on the two side edges of the window opening is measured and from the averaged distance the position value for the midpoint is corrected. Next, the gripping device 10 with its pair of fine sensors 15 is moved towards the upper edge 5 of the windshield opening 19. The measuring procedure that follows is primarily intended to determine the visible windshield edges, for which a particularly exact fit is needed. The lower edge 6, on the other hand, is often hidden under other body parts, so that tolerances here are not important, and the windshield pane 4 can be at a greater distance from the step 8.

If the gripping device 10 with the windshield pane 4 is twisted in its plane with respect to the windshield opening 19, in this search procedure only one of the two fine sensors 15 comes into contact at first with the step 8 for measurement. The position values at that moment are stored in the control unit memory as a fixed point. The windshield 4 is then rotated in its plane around this point until the second fine sensor 15 also gives off a measurement signal. The position of the upper edge 5 is precisely defined by the two measurement signals, or rather by the position values stored in the memory on the basis of those signals, and from there one can then proceed to the centering step already described with the lower edge 6.

From the fine measurement, with corresponding correction of the present distance between the windshield edges and the projecting sensors, the final midpoint for the mounting position of the windshield 4 is determined. Once the mounting position is assumed, the adjusting cylinders 11 admit air via the circular line 16 and press the windshield 4 with the adhesive bead 17 against the groove 7 in the bodywork. Because of the preset, uniform air pressure, the windshield 4 is pressed with equal pressure at all points. Distance irregularities in the groove 7 in the bodywork due to lag or warping are compensated for by the differential lengths of the forward paths of the various adjusting cylinders 11.

Figure 4:
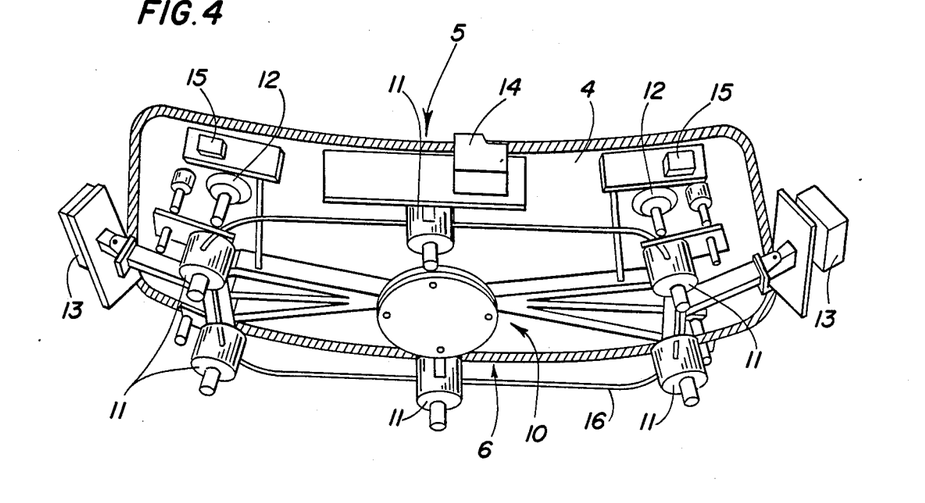
FIG. 4 is a perspective view of a manipulating device for positioning a windshield similar to FIG. 1 showing a different configuration of the invention.
Figure 5:
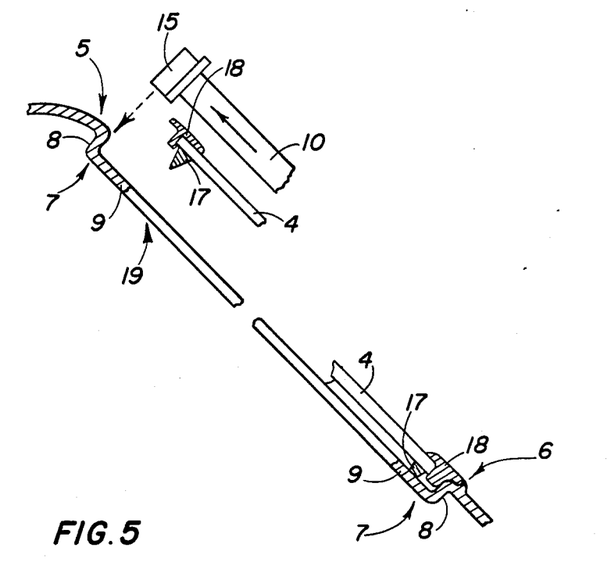
FIG. 5 is a plan and sectional view showing measurement positions of the sensors according to the invention.

In the configuration example as per FIGS. 4 and 5, the motor vehicle 2 is brought into an exact preliminary position relative to the manipulator 1 with a more precise transport unit 3. Hence, the rough measurement is unnecessary and only a single-step measurement of the windshield opening is required.

For this, the windshield is moved by the manipulator 1 up to a distance of around 50 mm from the windshield opening 19. With the precision transport unit 3, the positional tolerance of the windshield opening 19 relative to the nominal position is less than the measurement range of the edge-feeling sensors 13,15. With the exact position path control of the industrial robot 1, the grip 10 with the sensors 13,15 is thereby moved so close to the windshield opening 19 that the latter is within the sensor measurement range, taking into account all positioning tolerances. In some circumstances, a sensor distance measurement for exact positioning can take place, for example, on the inside backward-displaced bearing surface 9 of the car body groove 7.

From the approximated position of the grip 10 with the windshield 4 and the sensors 13,14,15 the precise measurement of the windshield opening 19 now begins directly. The size of the opening is also measured in this process, determining and averaging out tolerances in length and width of the windshield opening.

Secured to the arms of the grip 10 are lengthwise-adjustable and tiltable identical edge-feeling precision sensors 13,15 and a distance sensor 14. The distribution and arrangement of the sensors 13, 14, 15 are basically the same as in the first configuration example. The edge-feeling sensors 13, 15 for high measurement precision have a narrow measurement range of preferably plus/minus 3 mm with a reach of ca. 50 mm and are quite tolerant of different surface paints. The distance sensor 14 is the same as in the first configuration example.

Accordingly as the sensors are moved crosswise over the windshield opening in order to center the windshield in the axes of translation, essentially a single edge-feeling sensor is sufficient. To correct for angle errors, a pair of such sensors 15 is required, placed alongside each other with a spacing on one edge of the windshield, preferably the upper edge 5. For maximum measurement precision, it is recommended to have sensors 13,15 on at least three edges of the windshield.

Alternatively, the sensors 13, 15 in both configuration examples can also be designed differently, for example, as mechanical probes, capacitive or inductive proximity transmitters or the like. For a reliable feeling of the edges, however, it is especially recommended to employ optical sensors, particularly in the form of reflected light sensors. These come in different ranges or working distances and sensitivities, depending on the positioning accuracy to be attained. A distance measurement, if necessary, is also to be done preferably with reflected light sensors, in the special design as distance sensor.

The angle correction of the windshield about the axis perpendicular to the windshield can be done as in the first configuration example or according to the alternatives described below.

The grip is moved along the installation line up to the edge of the opening to be measured. As soon as the first sensor 15 transmits an edge signal, the latter is saved in the track control of the industrial robot 1 as path information. The grip is then moved further on until the second sensor 15 transmits an edge signal, which is also saved. From the positional coordinates, the distance of the sensors in the direction of motion resulting from the crooked position is calculated in the robot control. This value represents the sine of the error angle relative to the distance between the sensors on the grip. The error angle is evaluated from this in the track control and used as a correction factor for the position of the windshield.

Essentially, the distance can also be calculated from a signal time difference at given velocity.

Figure 3:
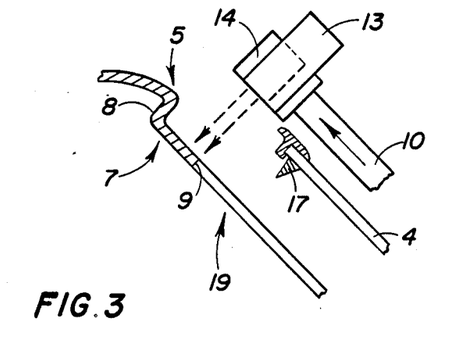
FIG. 3 is a plan and sectional view showing measurement positions of the sensors.

The above angle correction alternative can also be employed in connection with a measurement of the opening by the first configuration example in FIG. 1-3 or any other measurement at all.

The described processes are based on an adjustment at the upper edge 5 of the windshield opening 19 or the windshield 4 with corresponding arrangement of the pair of sensors 15. Instead of this, a different edge of the windshield or the opening can be used, the pair of sensors 15 also being positioned in a different location. Furthermore, it is also possible to start from the calculated midpoint of the installation, instead of a central line.

While specific embodiments of the invention have been shown and described in detail to illustrate the application of the principles of the invention, it will be understood that the invention may be embodied otherwise without departing from such principles.

What is claimed is:

1. A process for the automatic positioning of a windshield for mounting a windshield in a windshield opening of a vehicle using an automatic windshield gripper carrying at least one sensor comprising the steps of: passing the windshield gripper carrying the said at least one sensor over the windshield opening across edges of the opening; and, detecting said edges, using said at least one sensor, as said at least one sensor passes across said edges of said windshield opening.

2. A process according to claim 1, further comprising: measuring the windshield opening in at least four axes first on a gross scale and then on a fine scale.

3. A process according to claim 2, wherein a mounting groove having free inner edges is defined around the windshield opening, and the gross measurement includes determining the position of at least two of the free inner edges by passing over the windshield opening in a transverse direction, and deriving a reference point from that for the fine measurement and finally determining the distance of the windshield from the windshield opening.

4. A process according to claim 3, wherein outer edges of the windshield mounting groove are defined by a step encircling the opening, the process further including taking a fine measurement of the position of the step edge with respect to the support groove by passing over the support groove and the step edge and thereafter deriving the mounting midpoint of the windshield form this measurement, and subsequently starting from the mounting midpoint position already calculated, approaching an edge of the windshield opening that is visible on the vehicle adjacent the step of the supporting groove in a direction towards the step edge to determine at least one point thereof, and turning the windshield around this point until another point on said step is detected.

5. A process according to claim 2, including pressing the windshield into the windshield opening at a plurality of points distributed over its surface with equal pressure but through differential adjustable paths.

6. A process for mounting a windshield into an opening in a frame of a vehicle having a windshield support groove with lateral, top and bottom end steps around said groove, and using a manipulator having a movable manipulator arm carrying a gripping device engageable with the windshield and having a plurality of gross sensors and fine sensors spaced around the windshield, comprising: using the gross sensors to control the manipulator arm to move the manipulator arm to position the gripping device to engage the windshield and to effect an initial positioning of the windshield in the opening to the frame, and thereafter using the fine sensors to control the manipulator arm to reposition the windshield in the frame.

7. A process according to claim 6, wherein said gripping device includes a central portion connected to the manipulator arm, a plurality of radially extending angularly spaced arms, plurality of suction gripping members being adjustably mounted on said arms for movement toward and away from the windshield for engagement and disengagement therefrom, said arms providing sensor support on each side of the windshield adjacent the top and bottom of the windshield in a sensor mounted on each of said supports, said gripping members comprising suction elements having means for supplying and removing a fluid therefrom for engagement and disengagement from the windshield, and including the step of applying only some of said gripping arms to the windshield while rotating said windshield.

8. A device for mounting a windshield in a vehicle windshield opening and for attachment to a rotatable and pivotal manipulator arm, comprising: a combined gripping device and sensor holder engageable with the arm and being rotatable therewith and including at least one gross sensor carried by said gripping device; and, at least two fine sensors, for detecting each edge of the windshield opening carried by said gripping device, positioned on a side of the gripping device which is for engagement with a side of the windshield and located at spaced locations from each other.

9. A device according to claim 8, including at least one distant sensor carried on said gripping device for sensing the position of a windshield relative to a vehicle windshield receiving opening.

10. A device according to claim 8, including at least two sensors carried by said gripper and sensor member which extend laterally beyond the windshield when it is engaged by said grippers and comprise reflected light detectors.

11. A device according to claim 8, wherein said gripping device has a plurality of fluid pressure operated adjusting piston and cylinder members held thereby so that they can engage adjustably said windshield at spaced locations and including a fluid pressure line connected to each of said adjusting piston and cylinder members.

12. A process for positioning a windshield relative to a windshield opening including employing first and second sensors carried by a windshield gripper to measure the windshield opening; positioning the windshield using the windshield gripper in a centered position corresponding to the measured windshield opening; moving the windshield gripper along the installation line over the opening carrying the first sensor across the edge of the opening to be measured; transmitting an edge signal representing the position of the first sensor as it is carried across the edge; moving the gripper further until a second sensor is carried across the edge of the opening to be measured; transmitting an edge signal representing the position of the second sensor; calculating, from the position signals transmitted, the distance of the sensors in a direction of motion resulting from the crooked position, this value representing the sine of the error angle relative to the distance between the sensors of the gripper; evaluating the error angle to determine a correction factor for the position of the windshield.

13. A process according to claim 12, further comprising: measuring the windshield opening in at least four axes first on a gross scale and then on a fine scale.

14. A process according to claim 12 wherein: the gross measurement includes determining the position of at least two of the inner edges of a mounting groove defined around the receiving opening by passing over the windshield opening in a transverse direction, and deriving a reference point from that step of passing for the fine measurement and, finely, determining the distance of the windshield from the windshield opening.

15. A process according to claim 14, wherein: the windshield opening includes an encircling step edge defining the mounting groove around the windshield opening inwardly of the step edge and further comprising taking a fine measurement of the position of the step edge in respect to the support groove by passing over the support groove and the step edge and thereafter deriving the mounting mid-point of the windshield from this measurement, and subsequently starting from the mounting mid-point position already calculated, approaching an edge of the windshield opening that is visible on the vehicle adjacent the step of the supporting groove in a direction towards the step edge to determine at least one point thereof, and turning the windshield around this point until another point on said step is detected.

* * * * *